(12) United States Patent
Allen et al.

(10) Patent No.: US 7,529,603 B2
(45) Date of Patent: May 5, 2009

(54) INTEGRATED PERFORMANCE APPLICATION

(75) Inventors: David L. Allen, Kent, WA (US); Timothy W. Anstey, Seattle, WA (US); Steven J. Yukawa, Seattle, WA (US); Steven J. Churchill, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 11/384,612

(22) Filed: Mar. 20, 2006

(65) Prior Publication Data

US 2007/0219676 A1 Sep. 20, 2007

(51) Int. Cl.
*G01C 23/00* (2006.01)

(52) U.S. Cl. .......................................... 701/3; 701/29

(58) Field of Classification Search ................. 701/29, 701/3; 702/183, 184; 714/25; 382/149
See application file for complete search history.

(56) References Cited

U.S. PATENT DOCUMENTS

| | | | | |
|---|---|---|---|---|
| 6,003,808 A | * | 12/1999 | Nguyen et al. | 244/1 R |
| 6,574,537 B2 | * | 6/2003 | Kipersztok et al. | 701/29 |
| 7,050,894 B2 | * | 5/2006 | Halm et al. | 701/33 |
| 7,209,814 B2 | * | 4/2007 | Kipersztok et al. | 701/29 |
| 2002/0138184 A1 | | 9/2002 | Kipersztok | |
| 2003/0660654 | | 8/2003 | Glenn | |

OTHER PUBLICATIONS

The Boeing Company, PCT/US2007/006947 mailed May 16, 2008.

* cited by examiner

*Primary Examiner*—Mark Hellner
(74) *Attorney, Agent, or Firm*—Evan Law Group LLC

(57) ABSTRACT

An electronic flight bag is disclosed which includes an electronic logbook module having an electronic logbook database. The electronic logbook module is configured to compile a list of deferred maintenance items including one or more MEL items. The electronic flight bag also includes an onboard performance tool module operatively connected to the electronic logbook module. The onboard performance tool module is configured to access the list of deferred maintenance items compiled by the electronic logbook module and calculate a plurality of performance parameters. The electronic flight bag also includes an electronic document browser module operatively connected to the electronic logbook module and the onboard performance tool module. The electronic document browser module includes an electronic document browser database storing documentation regarding the MEL item(s) included in the list of deferred maintenance items compiled by the electronic logbook module.

32 Claims, 5 Drawing Sheets

INTEGRATED PERFORMANCE APPLICATION

BACKGROUND

The present application relates generally to aircraft and, more specifically, to computer applications implemented on aircraft.

The calculation of takeoff performance parameters affects both the safety and the economics of airline operations. Examples of such takeoff parameters include takeoff decision speed, rotation speed, and climbout speed. Current methods for calculating these parameters involve manual calculations by the flight crew. In some cases, flight crew members manually calculate takeoff parameters using traditional paper documentation, and manually derive modifications necessary for deferred maintenance items and runway conditions. In other cases, the flight management computer (FMC) performs initial calculations of takeoff parameters, but flight crew members typically must adjust these initial calculations manually to account for deferred maintenance items and other conditions not considered by the FMC.

The manual calculations performed by the flight crew often require flight crew members to manually refer to the deferred maintenance log and on-board documentation. This approach frequently leads to conservative estimates on the part of the flight crew, thereby resulting in sub-optimal takeoff reference speeds. In addition, flight crew members can miss certain deferred maintenance items or incorrectly interpret runway conditions, leading to the manual derivation of takeoff parameters which could compromise safe operation.

SUMMARY

The above-mentioned drawbacks associated with existing methods of calculating takeoff parameters are addressed by embodiments of the present invention, which will be understood by reading and studying the following specification.

In one embodiment, an electronic flight bag comprises an electronic logbook module comprising an electronic logbook database. The electronic logbook module is configured to compile a list of deferred maintenance items including one or more MEL items. The electronic flight bag further comprises an onboard performance tool module operatively connected to the electronic logbook module. The onboard performance tool module is configured to access the list of deferred maintenance items compiled by the electronic logbook module and calculate a plurality of performance parameters. The electronic flight bag further comprises an electronic document browser module operatively connected to the electronic logbook module and the onboard performance tool module. The electronic document browser module comprises an electronic document browser database storing documentation regarding the MEL item(s) included in the list of deferred maintenance items compiled by the electronic logbook module.

In another embodiment, a method of calculating aircraft performance parameters comprises performing an initial calculation of the aircraft performance parameters and retrieving a current deferred item list comprising a plurality of MEL items from a database compiled by an electronic logbook. The current deferred item list represents a current maintenance status of an aircraft. The method further comprises evaluating the impact, if any, of the current deferred item list on the initial calculation of the aircraft performance parameters. If the deferred item list affects the initial calculation of the aircraft performance parameters, the method further comprises automatically adjusting the initial calculation based on the current deferred item list to arrive at a final calculation of the aircraft performance parameters, and displaying the final calculation of the aircraft performance parameters to a user.

In another embodiment, an aircraft comprises a programmable electronic flight bag system for collecting, transmitting, and interfacing flight data. The programmable electronic flight bag system comprises a display screen programmable for displaying information relevant to flying and maintaining an aircraft and computing means operatively connected to the display screen, the computing means having a plurality of input means. The electronic flight bag system further comprises data collection means for gathering raw data including deferred maintenance items, runway conditions and obstacle height, flight data, flight management computer data, weather data mapping, air traffic, airport gate and taxiway data. The electronic flight bag system further comprises electronic document browser means for accessing and displaying information electronically stored in the electronic flight bag, electronic logbook means capable of receiving and storing equipment failures of the aircraft, and performance application means for calculating takeoff parameters, taking into account deferred maintenance items and other relevant crew-entered parameters.

These and other embodiments of the present application will be discussed more fully in the detailed description. The features, functions, and advantages can be achieved independently in various embodiments of the present application, or may be combined in yet other embodiments.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1A:
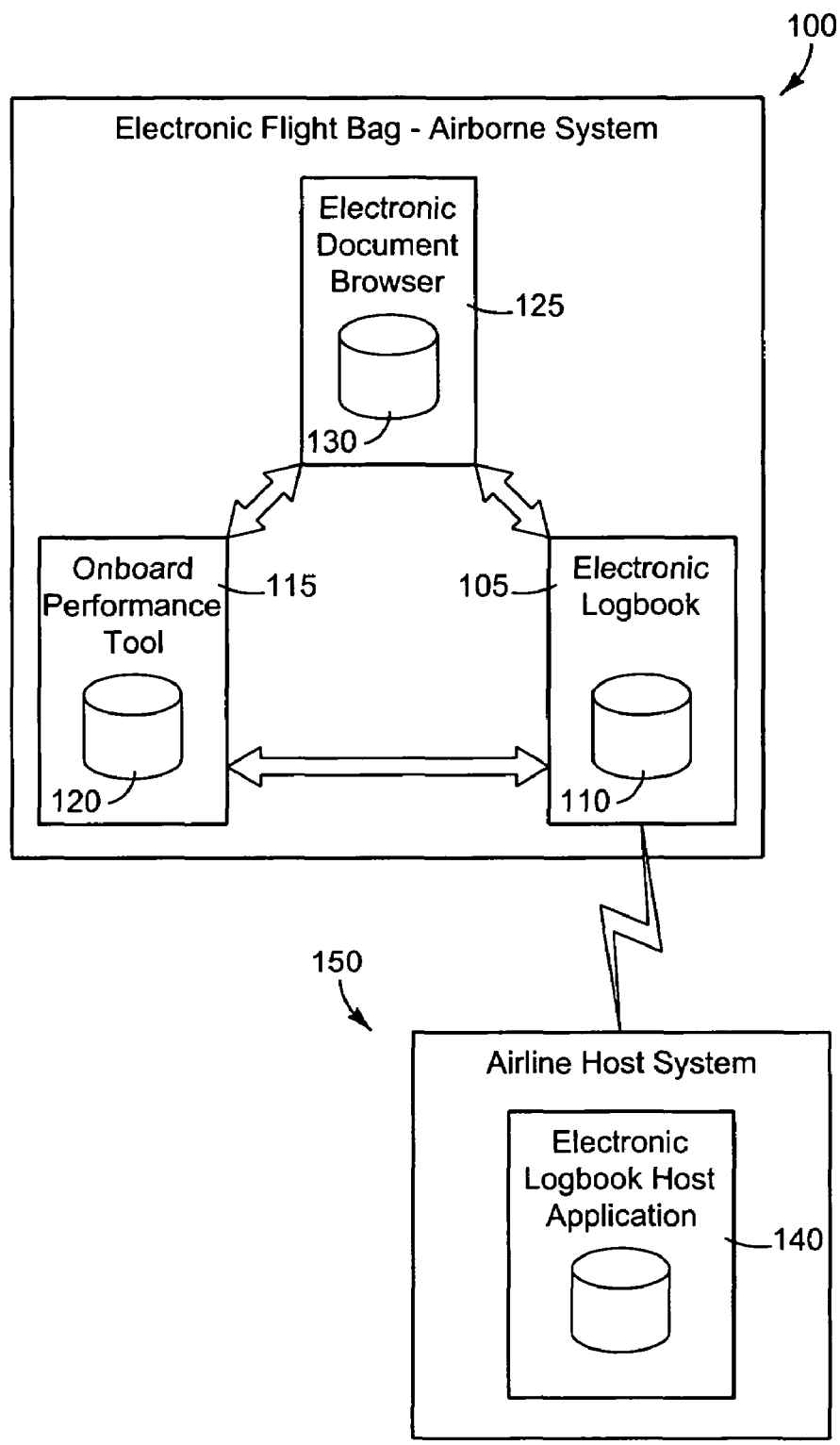
FIGS. 1A and 1B illustrate a block diagram of an Electronic Flight Bag in communication with an airline host system.
Figure 4:
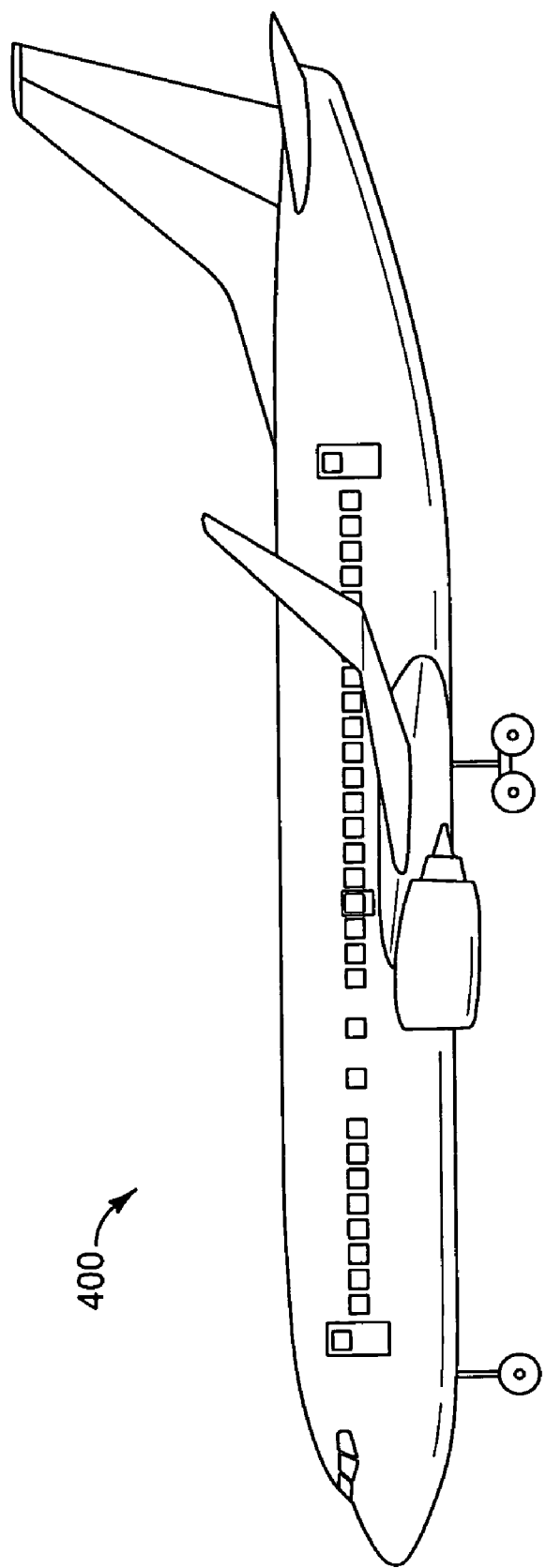
FIG. 4 is a schematic of an exemplary aircraft on which the Electronic Flight Bag can be implemented.

FIG. 1A is a block diagram of an Electronic Flight Bag (EFB) 100 in communication with an airline host system 150. In general, the EFB 100 comprises a general-purpose computing system which provides a flight crew with several applications that enhance their capability to operate an aircraft, such as the aircraft 400 illustrated in FIG. 4. In some embodiments, the EFB 100 comprises a display screen (not shown) programmable for displaying information relevant to flying and maintaining an aircraft, as well as computing means operatively connected to the display screen. The computing means often has a plurality of input means, such as, for example, buttons, knobs, keyboards, touch screens, etc. In the illustrated embodiment, the EFB 100 comprises an Electronic Logbook (ELB) module 105 having an ELB database 110, an On-Board Performance Tool (OPT), or "Performance Application," module 115 having an OPT database 120, and an Electronic Document Browser (EDB) module 125 having an EDB database 130.

The term "module" as used herein, may refer to any combination of software, firmware, or hardware used to perform the specified function or functions. It is contemplated that the functions performed by the modules described herein may be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof Additionally, the described modules may reside at different locations connected through a wired or wireless telecommunications network, or the Internet.

The ELB module 105, OPT module 115, and EDB module 125 are in communication with one another. As described below, the communication links between these modules 105, 115, 125 provide a number of advantages, such as allowing automatic linkage of deferred maintenance items (entered in the ELB module 105) to the Performance Application 115. This linkage improves the accuracy of deferred maintenance item entries and enhances the capabilities and performance of the OPT module 115.

Figure 1B:
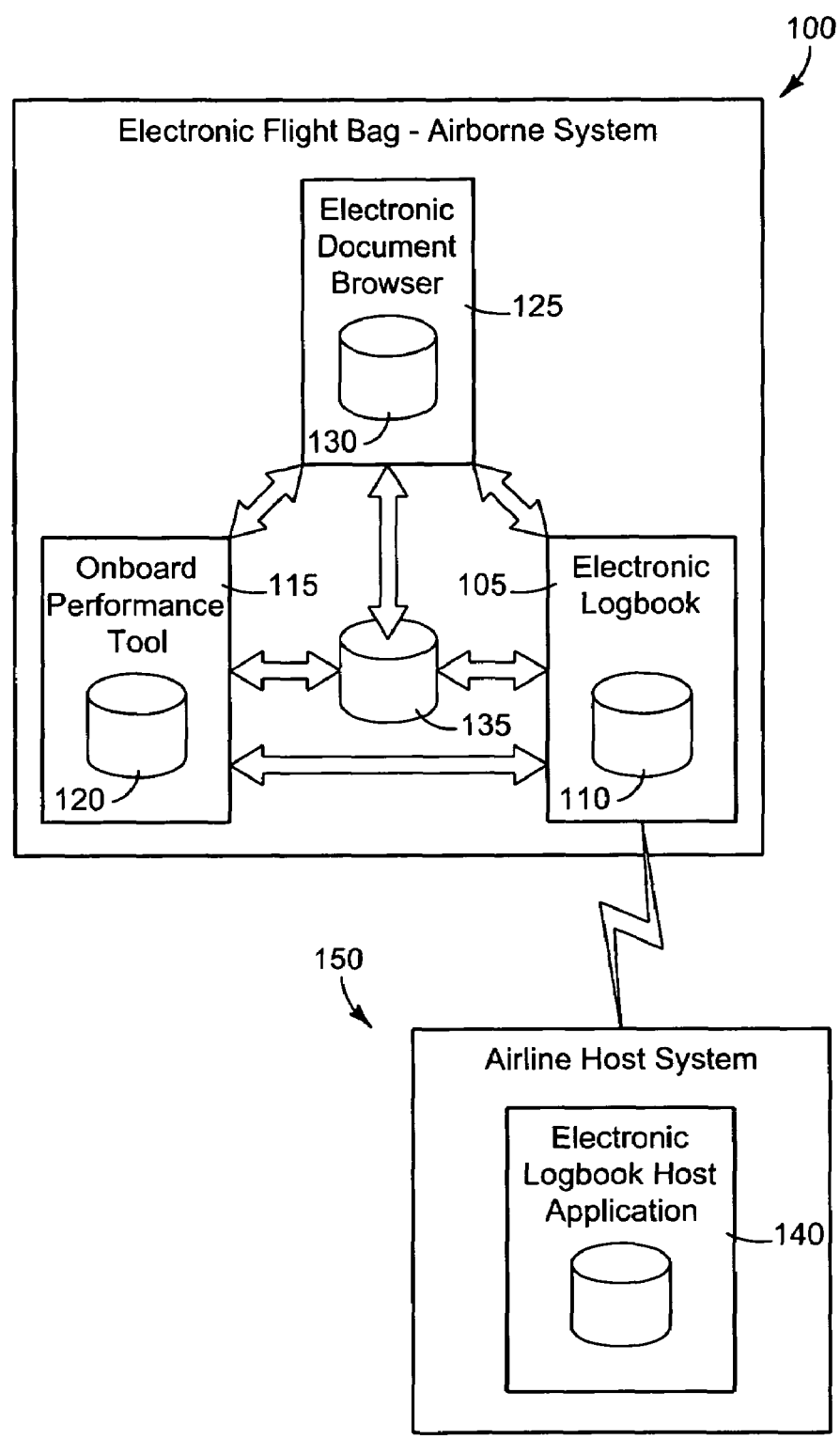

As shown in FIG. 1B, the EFB 100 may also comprise an optional common database 135 in communication with the ELB module 105, OPT module 115, and EDB module 125. In some embodiments, the common database 135 stores only data that is shared by the ELB module 105, OPT module 115, and EDB module 125, and each module 105, 115, 125 maintains its own separate database 110, 120, 130. In other embodiments, the common database 135 may store redundant data to backup or replace the ELB database 110, OPT database 120, and EDB database 130. In addition, the modules 105, 115, 125 can interact with one another via the common database 135 or can interact directly via the communication links illustrated in FIG. 1.

In operation, the ELB module 105 can be used by flight crew members to enter equipment malfunctions and/or failures into the technical log of an aircraft. These entries can be automatically synchronized with a client application 140 at the airline host system 150. In some embodiments, the EFB 100 comprises a radio interface capable of forming an uplink and a downlink between the aircraft and the airline host system 150, which can transmit real time flight data including aircraft operational data, security data and video data.

Airline maintenance personnel can access the ELB module 105 directly or remotely to close the equipment failure records or to defer them. The deferred maintenance items may have an impact on the calculation of takeoff parameters such as, for example, takeoff decision speed, rotation speed, and climbout speed.

Some conventional aircraft do not include a Performance Application or On-Board Performance Tool. In these aircraft, a computer often performs an initial calculation of takeoff parameters, but this initial calculation cannot be used directly when there are deferred maintenance items which affect takeoff performance. Rather, the flight crew typically must consult paper documentation and manually modify the takeoff parameter calculation. Such manual modifications generally do not take into account the complexity of multiple deferrals, and frequently lead to conservative takeoff parameter calculations and reduced economy.

In other conventional aircraft, a Performance Application is included which performs initial calculations of takeoff parameters. Even in these aircraft, however, flight crew members must often manually enter deferred maintenance items into the Performance Application so that the penalties associated with the deferred items can be considered in the calculation. In addition, crew members must often manually check the documentation to confirm their choices of deferred maintenance items. Such manual procedures can lead to errors, such as, for example, crew members missing one or more deferred maintenance items.

In embodiments of the present application, the OPT module 115 of the EFB 100 is used to calculate takeoff parameters. The OPT module 115 advantageously receives deferred maintenance items which affect takeoff parameter calculations from the ELB module 105, and enters the items into a deferred maintenance list. As a result, the OPT module 115 can advantageously take into account the deferred maintenance items and other crew-entered parameters automatically when calculating takeoff parameters. In addition, the OPT module 115 can advantageously account for the complexity of multiple variables affecting takeoff parameter calculations, such as, for example, the relationship between runway conditions, obstacle height, and one or more deferred maintenance items.

The EDB module 125 includes electronic copies of aircraft-related documentation, preferably including embedded hyperlinks to facilitate easy access to sections of interest to flight crew members. The EDB module 125 can also make the list of deferred maintenance items available to the flight crew for viewing. Thus, the EDB module 125 advantageously enables flight crew members to readily access relevant documentation to understand the impact of equipment failures and to confirm the validity of the takeoff parameter calculation made by the OPT module 115.

As discussed above, the EFB 100 allows the integration of the ELB module 105, OPT module 115, and EDB module 125. The integration of modules within the EFB 100 can be accomplished using a variety of suitable techniques that are well-known to those of ordinary skill in the art. In some embodiments, the ELB module 105, OPT module 115, and EDB module 125 regularly notify "subscriber" applications of relevant changes in status. In addition, the ELB module 105, OPT module 115, and EDB module 125 can respond to direct requests for information from one another or from other applications. In some embodiments, each module 105, 115, 125 stores the data required by other applications within its own database 110, 120, 130, whereas in other embodiments, shared data is stored in the optional common database 135.

The operation of one exemplary embodiment is described below. In the exemplary embodiment, the ELB module 105 maintains an ELB database 110 with an available Deferred Items List (DIL). Upon startup, the OPT module 115 polls the ELB database 110 for the latest DIL. In addition, the OPT module 115 polls the ELB database 110 for the latest DIL upon commencing a calculation, e.g., a takeoff parameter calculation. The OPT module 115 allows pre-selection of Minimum Equipment List (MEL) items based on the DIL stored in the ELB database 110. The OPT module 115 displays to the user relevant differences between the DIL stored in the ELB database 110 and the MEL selected by the OPT module 115.

The ELB module 105 notifies the OPT module 115 of changes to the DIL. In some cases, the ELB module 105 notifies the OPT module 115 of all such changes, whereas in other cases, the ELB module 105 notifies the OPT module 115 of only those changes to the DIL which affect performance.

The OPT module 115 notifies the ELB module 105 of changes to selected MEL items and to any subsequent calculations. The ELB module 105, in turn, displays to the user any calculations made by the OPT module 115 with a different set of MEL items than in the DIL.

In the exemplary embodiment described herein, the ELB module 105 provides links into the EDB module 125 based on MEL item number. In addition, the OPT module 115 provides links into the EDB module 125 based on MEL item number.

Figure 2:
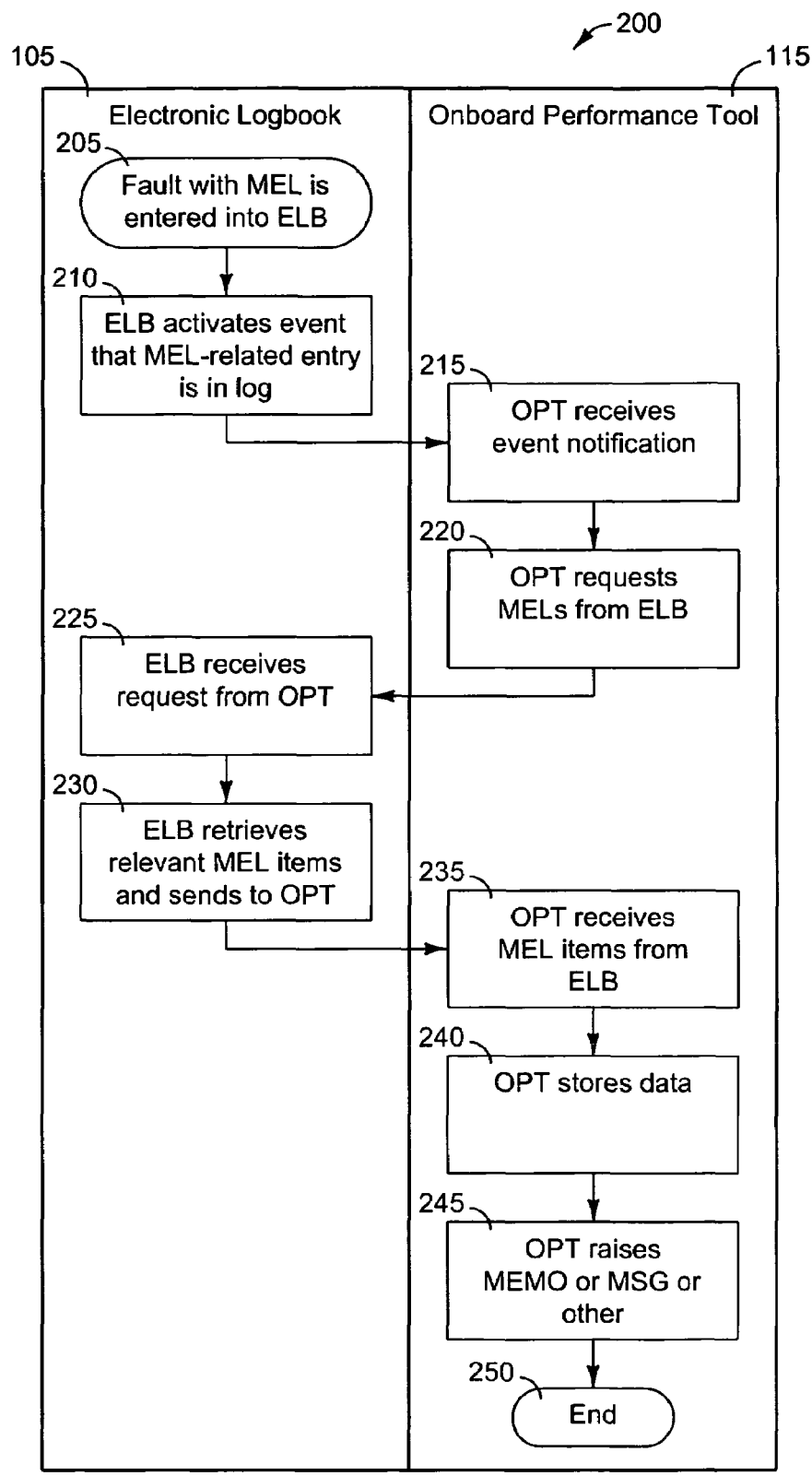
FIG. 2 is a flow chart illustrating a process flow in which an Electronic Log Book publishes events to which an On-board Performance Tool responds.

FIG. 2 is a flow chart illustrating a method 200 in which the ELB module 105 publishes events to which the OPT module 115 responds. At block 205, an equipment malfunction or fault, with an associated MEL, is entered into the ELB module 105, typically by a member of the flight crew, grounds crew, and/or maintenance personnel. At block 210, the ELB module 105 activates an event indicating that an MEL-related entry has been recorded in the technical log of the aircraft. At block 215, the OPT module 115 receives an event notification from the ELB module 105.

At block 220, the OPT module 115 requests the current DIL, including the updated MEL items, from the ELB module 105. At block 225, the ELB module 105 receives the request from the OPT module 115. At block 230, the ELB module 105 retrieves relevant MEL items from the ELB database 110 and sends the current DIL to the OPT module 115.

At block 235, the OPT module 115 receives the current MEL items from the ELB module 105. At block 240, the OPT module 115 stores the current MEL items in the OPT database 120. At block 245, the OPT module 115 raises a MEMO, MSG or other suitable flag to notify the user of relevant updates to the MEL items and, at block 250, the process 200 ends.

Figure 3:
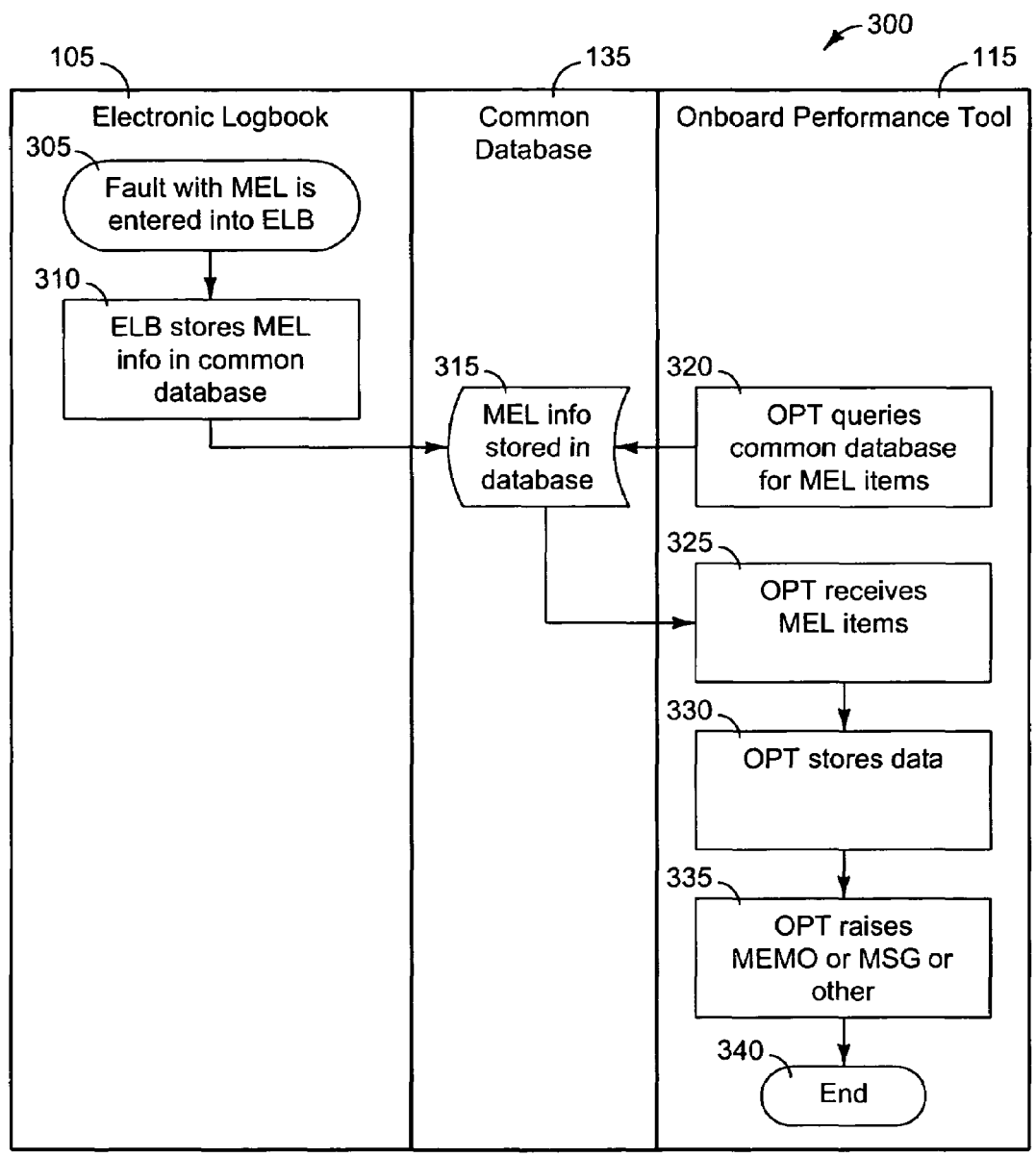
FIG. 3 is a flow chart illustrating a process flow in which an On-board Performance Tool pulls information directly from a data store.

FIG. 3 is a flow chart illustrating a method 300 in which the OPT module 115 pulls information directly from the optional common database 135. At block 305, an equipment malfunction or fault, with an associated MEL, is entered into the ELB module 105, typically by a member of the flight crew, grounds crew, and/or maintenance personnel. At block 310, the ELB module 105 initiates the storage of the updated MEL item in the common database 135. At block 315, the updated MEL item is stored in the common database 135.

At block 320, the OPT module 115 requests the current DIL, including any updated MEL items, from the common database 135. At block 325, the OPT module 115 receives the current MEL items from the common database 135. At block 330, the OPT module 115 stores the current MEL items in the OPT database 120. At block 335, the OPT module 115 raises a MEMO, MSG or other suitable flag to notify the user of relevant updates to the MEL items and, at block 340, the process 300 ends.

The integration of the ELB module 105, OPT module 115, and EDB module 125 within the EFB 100 provides a number of enhanced capabilities to the flight crew. For example, the EFB 100 advantageously enables optimized takeoff parameters to be calculated automatically, while assuring safe operation by taking into account all deferred maintenance items. In addition, the EFB 100 advantageously reduces the likelihood of missed accounting for deferred maintenance items which can occur using conventional manual techniques. The EFB 100 can also account for the complexity of multiple variables affecting takeoff parameter calculations.

In addition, the EFB 100 advantageously provides the flight crew with easy access to documentation of interest via the EDB module 125. Flight crew members can take advantage of hyperlinks between deferred maintenance items and related airplane documentation. As a result, the flight crew can assure that the takeoff parameter calculations are accurate and meet regulatory standards in making a final determination as to the safe and economic derivation of takeoff parameters.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. An electronic flight bag on an aircraft comprising:
   an electronic logbook configured to compile a list of deferred maintenance items from previous maintenance performed on the aircraft;
   an onboard performance tool module operatively connected to the electronic logbook, and configured to access the list of deferred maintenance items and to calculate a plurality of performance parameters; and
   an electronic document browser module operatively connected to the electronic logbook and the onboard performance tool module,
   wherein the electronic document browser module is configured to display said list of deferred maintenance items compiled by the electronic logbook.

2. The electronic flight bag of claim 1, further comprising a common database operatively connected to the electronic logbook, the onboard performance tool module, and the electronic document browser module.

3. The electronic flight bag of claim 2, wherein the list of deferred maintenance items is stored in the common database.

4. The electronic flight bag of claim 2, wherein the list of deferred maintenance items is stored in the common database.

5. The electronic flight bag of claim 1, wherein the list of deferred maintenance items is compiled based on inputs received from at least one of flight crew members, grounds crew members, and maintenance personnel.

6. The electronic flight bag of claim 1, wherein the list of deferred maintenance items is synchronized with a client application at an airline host system.

7. The electronic flight bag of claim 1, wherein the plurality of performance parameters comprise at least one of takeoff decision speed, rotation speed, and climbout speed.

8. The electronic flight bag of claim 1, wherein the onboard performance tool module is configured to account for at least one of runway conditions and obstacle height when calculating the plurality of performance parameters.

9. The electronic flight bag of claim 1, wherein the onboard performance tool module comprises an onboard performance tool database.

10. The electronic flight bag of claim 1, wherein the electronic document browser module includes embedded hyperlinks to facilitate access to sections of interest in stored documentation.

11. A method of determining aircraft performance parameters, comprising:
    performing an initial calculation of the aircraft performance parameters;

retrieving a deferred item list from previous maintenance performed on the aircraft;

evaluating the impact of the deferred item list on the initial calculation of the aircraft performance parameters;

adjusting the initial calculation based on the deferred item list; and displaying a final calculation of the aircraft performance parameters to a user.

12. The method of claim 11, further comprising enabling the user to access documentation regarding minimum equipment list items affecting the final calculation of the aircraft performance parameters via one or more hyperlinks.

13. The method of claim 11, wherein retrieving the deferred item list comprises requesting and receiving the deferred item list from an electronic logbook.

14. The method of claim 11, wherein retrieving the deferred item list comprises accessing a common database storing the deferred item list.

15. The method of claim 14, wherein the common database is periodically updated by an electronic logbook.

16. The method of claim 11, wherein the deferred item list is generated based on inputs received from at least one of flight crew members, grounds crew members, and maintenance personnel.

17. The method of claim 11, wherein the performance parameters comprise at least one of takeoff decision speed, rotation speed, and climbout speed.

18. A machine readable medium comprising machine readable instructions for causing a computer to perform a method for calculating aircraft performance parameters, the method comprising:

performing a first calculation of the aircraft performance parameters;

retrieving a deferred item list from previous maintenance performed on the aircraft;

evaluating the impact of the deferred item list on the first calculation of the aircraft performance parameters;

adjusting the first calculation based on the deferred item list providing a final calculation of the aircraft performance parameters; and displaying the final calculation of the aircraft performance parameters to a user.

19. The machine readable medium of claim 18, wherein the method further comprises enabling the user to access documentation regarding minimum equipment list items affecting the final calculation of the aircraft performance parameters via one or more hyperlinks.

20. The machine readable medium of claim 18, wherein retrieving the deferred item list comprises requesting and receiving the deferred item list from an electronic logbook.

21. The machine readable medium of claim 18, wherein retrieving the deferred item list comprises accessing a common database storing the deferred item list.

22. An aircraft comprising a programmable electronic flight bag system for collecting, transmitting, and interfacing flight data, the programmable electronic flight bag system comprising:

a display screen programmable for displaying information pertaining to flying and maintaining the aircraft;

computing means operatively connected to the display screen, the computing means having a plurality of input means;

data collection means for gathering raw data including at least one of deferred maintenance items, runway conditions and obstacle height, flight data, flight management computer data, weather data mapping, air traffic, airport gate and taxiway data;

electronic document browser means for accessing and displaying information electronically stored in the electronic flight bag system;

electronic logbook means capable of receiving and storing equipment failures of the aircraft; and performance application means for calculating takeoff parameters, taking into account at least one of deferred maintenance items and crew-entered parameters.

23. The aircraft of claim 22, further comprising a radio interface operatively connected to the computing means for forming an uplink and a downlink between said aircraft and a ground based control station, the radio interface transmitting real time flight data including at least one of aircraft operational data, security data and video data.

24. The electronic flight bag of claim 1, wherein said electronic logbook comprises an electronic database.

25. The electronic flight bag of claim 1, wherein the list of deferred maintenance items includes one or more minimum equipment list items.

26. The electronic flight bag of claim 1, wherein the electronic document browser module comprises an electronic document browser database.

27. The electronic flight bag of claim 26, wherein the electronic document browser database is configured to store documentation regarding one or more minimum equipment list items in the list of deferred maintenance items.

28. The method of claim 11, wherein said deferred item list comprises a plurality of minimum equipment list items.

29. The method of claim 11, wherein said deferred item list is compiled by an electronic logbook.

30. The method of claim 11, wherein the final calculation is based on the adjusted calculation.

31. The machine readable medium of claim 18, wherein said deferred item list comprises a plurality of minimum equipment list items.

32. The machine readable medium of claim 18, wherein said deferred item list is from a database compiled by an electronic logbook.

* * * * *